(12) United States Patent
Buesing

(10) Patent No.: US 10,113,609 B2
(45) Date of Patent: Oct. 30, 2018

(54) VIBRATION ISOLATING DEVICE FOR AN ELASTIC COUPLING OF TWO COMPONENTS

(71) Applicant: AIRBUS HELICOPTERS DEUTSCHLAND GMBH, Donauworth (DE)

(72) Inventor: Moritz Buesing, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 476 days.

(21) Appl. No.: 15/175,469

(22) Filed: Jun. 7, 2016

(65) Prior Publication Data

US 2017/0037927 A1    Feb. 9, 2017

(30) Foreign Application Priority Data

Jun. 29, 2015   (EP) .................................... 15400027

(51) Int. Cl.
*F16M 1/00*        (2006.01)
*F16F 15/02*       (2006.01)
(Continued)

(52) U.S. Cl.
CPC .......... *F16F 15/022* (2013.01); *B64C 27/001* (2013.01); *F16F 7/104* (2013.01);
(Continued)

(58) Field of Classification Search
CPC ...... F16M 11/08; F16M 13/02; F16M 11/048; H05K 7/16; H05K 7/1461; F16F 7/104;
(Continued)

(56) References Cited

U.S. PATENT DOCUMENTS 3,179,364 A * 4/1965 Jackson ................... A47B 9/00
                                                         248/571
4,401,298 A * 8/1983 Eaton ..................... F16F 13/20
                                                         248/562
(Continued)

FOREIGN PATENT DOCUMENTS

EP      1469224 A2    10/2004
EP      1469224 A3    12/2004
(Continued)

OTHER PUBLICATIONS

Extended European Search Report for European Application No. EP 15400027.7, Completed by the European Patent Office, Dated Jan. 28, 2016, 8 Pages.

*Primary Examiner* — Gwendolyn W Baxter
(74) *Attorney, Agent, or Firm* — Brooks Kushman P.C.

(57) ABSTRACT

A vibration isolating device that is adapted for an elastic coupling of a first component to a second component and for vibration isolation in predetermined frequency ranges between the first and second components, the vibration isolating device comprising at least a first and a second elastically deformable plate that are attached to each other in at least two separate connecting points, the first elastically deformable plate comprising a first curvature and the second elastically deformable plate comprising a second curvature, wherein the first and second curvatures are respectively located in a region between the at least two separate connecting points and arranged such that a gap is defined between the first and second elastically deformable plates.

17 Claims, 12 Drawing Sheets

(51) Int. Cl.
*F16F 15/04* (2006.01)
*F16F 15/06* (2006.01)
*F16F 7/104* (2006.01)
*B64C 27/00* (2006.01)
*F16F 7/108* (2006.01)
*F16F 7/116* (2006.01)
*F16F 13/00* (2006.01)

(52) U.S. Cl.
CPC .............. *F16F 7/108* (2013.01); *F16F 7/116* (2013.01); *F16F 13/00* (2013.01); *F16F 15/04* (2013.01); *F16F 15/06* (2013.01); *B64C 2027/002* (2013.01); *F16F 2224/02* (2013.01); *F16F 2224/0208* (2013.01); *F16F 2224/0241* (2013.01); *F16F 2228/066* (2013.01)

(58) Field of Classification Search
CPC .. F16F 7/108; F16F 7/116; F16F 13/00; F16F 15/04; F16F 15/06
USPC .......................................... 248/562, 619, 675
See application file for complete search history.

(56) References Cited

U.S. PATENT DOCUMENTS

| | | | |
|---|---|---|---|
| 4,458,861 A | 7/1984 | Mouille | |
| 4,673,170 A | 6/1987 | Dykema | |
| 5,088,580 A * | 2/1992 | Grothe | F16F 13/18 188/298 |
| 5,228,640 A | 7/1993 | Mouille | |
| 5,947,453 A | 9/1999 | Eastman et al. | |
| 6,247,684 B1 | 6/2001 | Manfredotti | |
| 6,283,408 B1 | 9/2001 | Ferullo et al. | |
| 8,441,615 B2 * | 5/2013 | Hashemi | F16F 15/06 248/562 |

FOREIGN PATENT DOCUMENTS

| | | |
|---|---|---|
| EP | 2628682 | 8/2013 |
| FR | 2787161 | 6/2000 |
| WO | 2014195575 | 12/2014 |

* cited by examiner

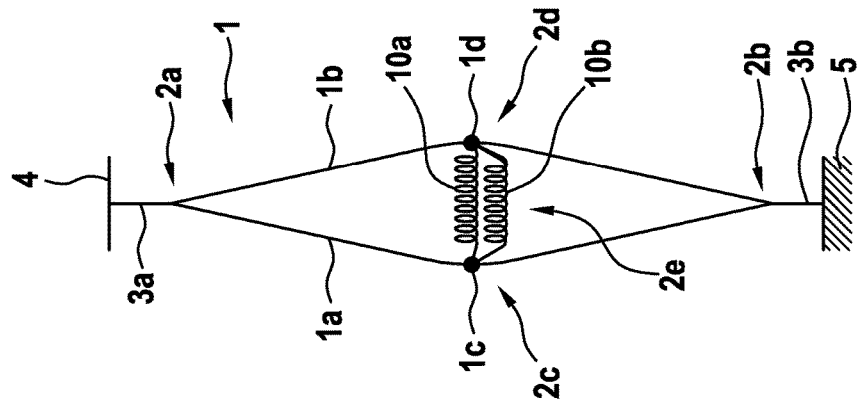
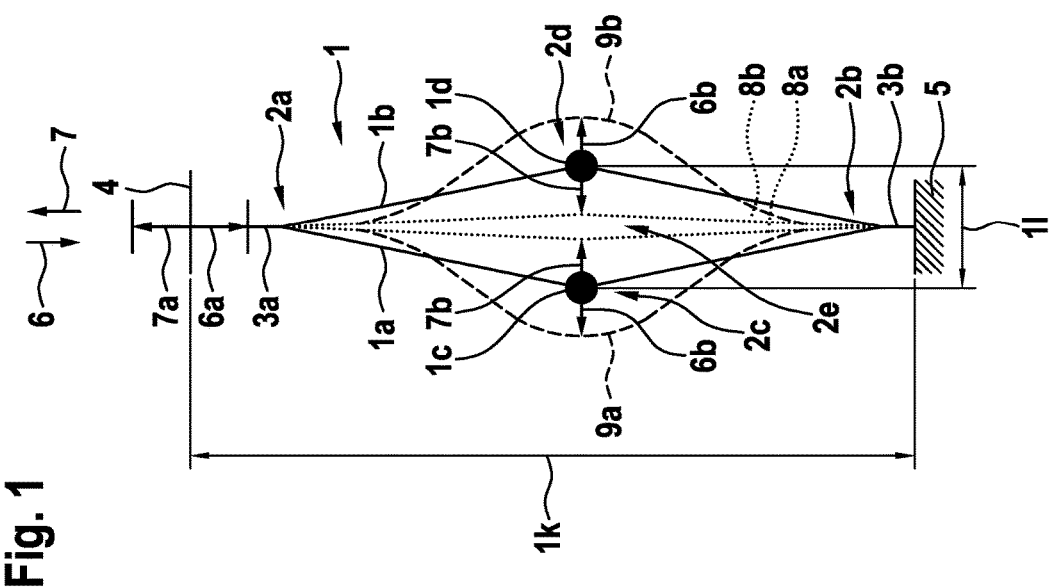

VIBRATION ISOLATING DEVICE FOR AN ELASTIC COUPLING OF TWO COMPONENTS

CROSS REFERENCE TO RELATED APPLICATION

This application claims priority to European patent application No. EP 15400027.7 filed on Jun. 29, 2015, the disclosure of which is incorporated in its entirety by reference herein.

BACKGROUND OF THE INVENTION

(1) Field of the Invention

The invention is related to a vibration isolating device that is adapted for an elastic coupling of a first component to a second component and for vibration isolation in predetermined frequency ranges between said first and second components, said vibration isolating device comprising the features of claim 1. The invention is further related to a helicopter with a first component that is elastically coupled to a second component by means of such a vibration isolating device, said helicopter comprising the features of claim 17.

(2) Description of Related Art

Vibration isolating devices that are adapted for an elastic coupling of two components and for vibration isolation in predetermined frequency ranges between these two components can e.g. be used in a helicopter for an elastic coupling between its main gear box and its fuselage. In this case, the vibration isolating devices are used to transmit static forces and torques that are acting on the helicopter's main rotor and, thus, on the main gear box, between the main gear box and the fuselage. They are further used to provide an effective damping or filtering action against the dynamic components of the transmitted static forces and torques acting via the main rotor on the main gear box in order to avoid occurrence of destructive vibration conditions in operation.

However, it should be noted that such vibration isolating devices are not only suitable for use in helicopters, but for use in any rotary wing aircraft and, generally, in aircrafts as a whole. Even more generally, such vibration isolating devices can be used everywhere where two components are to be coupled and where vibration isolation is necessary. In other words, such vibration isolating devices cannot only be used in aerospace engineering, but also in other technical domains such as automotive engineering, machinery and so on.

Accordingly, such vibration isolating devices are widely used today. By way of example, several conventional vibration isolating devices are described hereinafter.

The document U.S. Pat. No. 6,283,408 describes an anti-vibration suspension device for a main rotor of a helicopter that comprises a rotor mast driven in rotation by a main gear box about an axis of the mast, which is the axis of rotation of the rotor, i.e. the rotor axis. This anti-vibration suspension device includes at least three rigid and oblique bars for supporting the main gear box on a helicopter structure, such as its fuselage. The oblique bars are distributed around the main gear box and inclined relative to the rotor axis so as to converge with one another substantially at top ends towards a point on the rotor axis, the oblique bars being articulated and joined on the one hand to the main gear box by means of the top ends and on the other hand to the fuselage by bottom ends and by means of rigid levers, a same number of said levers being provided as there are oblique bars. Each lever supports at least one oscillating weight at one end and is articulated and joined to the fuselage by an opposite end part, in the vicinity of which the bottom end of a corresponding oblique bar is articulated on the corresponding lever. The articulated joints link each lever to the fuselage and to the corresponding oblique bar and are realized as articulated joints which pivot at least about pivot axes substantially perpendicular to a corresponding radial plane containing the rotor axis and a longitudinal axis of the corresponding oblique bar. Each lever is also linked to the main gear box by at least one torsion spring that is biased about a torsion axis that is substantially perpendicular to the corresponding radial plane, i.e. substantially parallel with the pivot axis of each lever on the fuselage and on the corresponding oblique bar.

The document U.S. Pat. No. 6,247,684 describes an antivibration device for reducing the transmission of vibration between two bodies. An elastic annular element is connected to the two bodies and is deformed under the action of vibration generated in said bodies. A resonator is connected, via two bending flexible leaves, to the internal face of the annular element. A support is arranged inside the elastic annular element. The support is secured, on the one hand to the bending flexible leaves and, on the other hand, to support pieces each bearing a mass. The document EP2628682 describes a device for dynamic isolation and damping of dynamic vibrations, in a passive way. The device is for a space shuttle and isolates and dampens payload. A plurality of identical elementary unit elements allows the device to be modular through individual modularity of each of the elementary unit elements that is tailored and designed individually. Each of the elementary unit element comprises a spring component and a damping component. The space shuttle and the payload are each secured to the deformable middle of spring components. At their outer ends, series of spring components are attached together and to series of parallel damping components.

The document EP1469224 describes an active spring-damper mechanism. The active spring-damper mechanism has a supporting spring member in the form of a flexible leaf spring that is fixed to a vibration-rigid structure. At the top of the free end of this supporting flexible leaf spring, a fastening element is arranged to be supported through an elastomer body on the flexible leaf spring. An annular space is formed by two leaf springs which are mutually conjugated and joined together.

The document WO2014195575 describes a tuned mass damper arrangement having an auxiliary mass which is attached to a vibrating structure via a wire rope isolator. A mass damper is provided with an additional intermediate block between attachment blocks. The attachment blocks are joined by a large helical spring wire, whereas the intermediate block is coupled to the attachment blocks via nested small helical spring wires, respectively.

The document U.S. Pat. No. 4,673,170 a dynamic recoil damping mechanism having a central coil compression spring means as a helical coil. Four articulated arms are each articulated for allowing a pivoting elbow-like action.

The document U.S. Pat. No. 5,228,640 describes a device for the elastic coupling between two parts, especially the principal transmission box and the fuselage of an aircraft with rotating wings, such as a helicopter. This device includes first and second inner and outer tubular bodies, and an elastic connection, housed in an annular space existing between the first and second bodies and coupling the first and second bodies in a leak tight fashion. The annular space is separated by the elastic connection into first and second chambers filled with a liquid. These first and second chambers are in communication with the inside of the first body. On the inside of this first body, there is a liquid distributor provided with an elastic damping connection and including two pistons, which are coupled by a piston rod and separated from each other by a distance separating orifices in the first and second chambers.

The document U.S. Pat. No. 4,458,861 describes an anti-vibration suspension device for a main transmission box of a helicopter. This anti-vibration suspension device comprises two elongated, flexible, elastic bars which are arranged parallel to each other and to the longitudinal axis of the helicopter's fuselage, at opposite sides of the transmission box. Each one of said bars is pivotally connected at two points to the helicopter's fuselage and has swinging bodies at its extremities. The bars, the pivotal connections and the swinging bodies are symmetrically arranged with respect to both the longitudinal and the transverse planes through a rotor shaft of the helicopter. Furthermore, means that are rigidly connecting the base of the main transmission box with each elastic bar in a region intermediate the pivotal connections between the bar and the helicopter's fuselage are provided, whereby each bar is made rigid in the intermediate region and has flexible portions between that region and the pivotal connections to the helicopter's fuselage. Moreover, a rod is provided that extends substantially in line with the helicopter's rotor shaft and is connected at its opposite ends with the base of the main transmission box and the helicopter's fuselage, the main transmission box being suspended through essentially only the bars and the rod and the latter serving to relieve the bars of the lifting forces imposed on the main transmission box.

The document U.S. Pat. No. 5,947,453 describes a spring-mass vibration absorber for absorbing vibration in a structure. This spring-mass vibration absorber comprises a baseplate with a first surface and a second surface, and a plurality of recurved springs connecting the baseplate to the structure. Each one of the recurved springs is fixedly connected to the first surface of the baseplate at a baseplate connection point, and fixedly connected to the structure at a structure connection point.

However, all of the above-described systems are comparatively complicated and bulky. Furthermore, they have complex designs and mainly use heavy and expensive components that are comparatively demanding on manufacturing tolerances. Consequently, they are rather expensive and time-consuming in manufacturing.

BRIEF SUMMARY OF THE INVENTION

It is, therefore, an object of the present invention to provide a new vibration isolating device that is adapted for an elastic coupling of a first component to a second component and for vibration isolation in predetermined frequency ranges between said first and second components, said vibration isolating device being comparatively lightweight and inexpensive and having a simple design and an increased life time compared to conventional vibration isolating devices.

This object is solved by a vibration isolating device with the features of claim 1. More specifically, according to the present invention a vibration isolating device that is adapted for an elastic coupling of a first component to a second component and for vibration isolation in predetermined frequency ranges between the first and second components comprises at least a first and a second elastically deformable plate that are attached to each other in at least two separate connecting points. The first elastically deformable plate comprises a first curvature located in a region between the at least two separate connecting points and the second elastically deformable plate comprises a second curvature located in a region between the at least two separate connecting points. The first and second curvatures are arranged such that a gap is defined between the first and second elastically deformable plates in the regions between the at least two separate connecting points, wherein the first and second curvatures are adapted to be reduced in operation if a tension force that moves the at least two separate connecting points away from each other is applied to the vibration isolating device, and wherein the first and second curvatures are adapted to be increased in operation if a compression force that moves the at least two separate connecting points towards each other is applied to the vibration isolating device.

Advantageously, the vibration isolating device according to the present invention has a comparatively simple design with a reduced amount of bearings and is comparatively low-cost, as e.g. no expensive components, such as hydraulics and so on, are required for its implementation. In particular, instead of mechanical bearings elastic parts can be used, thus, leading to comparatively low wear. Furthermore, it is less demanding on manufacturing tolerances than comparative conventional vibration isolating devices, while providing a higher overall life time and allowing for reduced maintenance efforts. Moreover, the vibration isolating device according to the present invention provides for comparatively high fatigue strength, if the first and second elastically deformable plates are embodied by means of properly applied composite materials, in particular carbon composites. Finally, it can be built more compact and slender than conventional vibration isolating devices and, consequently, be used to replace e.g. existing connection struts in existing vibration isolating arrangements without need for any additional devices.

According to one aspect of the present invention, the vibration isolating device is adapted for connecting two subsystems, such as e.g. a main gear box and a fuselage of a helicopter. The vibration isolating device according to the present invention primarily comprises two or more elastic plates, which are preferentially bar- or lath-shaped and connected to each other at their respective ends. Preferred materials for these elastic plates are carbon composites, but other composites and metals are also applicable.

Preferably, the elastic plates are not straight, but have a curvature. Thus, when a tension force is applied to the vibration isolating device according to the present invention, the elastic plates are straightened, i.e. their curvature is reduced. When a compression force is applied thereto, however, the curvature of the elastic plates increases. The tension and compression forces, therefore, lead to changes $\Delta a$ of a predetermined length a between the respective ends of the vibration isolating device.

The decreased (tension) or increased (compression) curvature of the elastic plates preferably leads to lateral displacements $\Delta bi$ at locations i along the elastic plates and other parts that are attached to the elastic plates. When the curvature is comparatively small, a ratio xi between the lateral displacements $\Delta bi$ at certain locations and the length changes $\Delta a$ can be comparatively large. In order to achieve a required efficient vibration isolation, preferentially corresponding vibration isolation masses Mi are placed at locations i where xi is large, wherein usually a maximum ratio xi is reached in the middle between the respective ends of the elastic plates. Realistic values for xi in such a configuration with two elastic plates are comprised in an interval from 2 to 20.

According to one aspect of the present invention, levers can be attached to the elastic plates in order to further amplify the lateral displacements Δbi at locations i on the levers. Usually, a maximum lateral displacement Δbi occurs at respective free ends of the levers, thereby increasing the ratio xi. Realistic values for xi in such a configuration with two elastic plates and corresponding levers are comprised in an interval from 2 to 50. The lateral displacements Δbi can even further be amplified by placing a third elastic plate between two locations i on the two other elastic plates, preferably instead of the corresponding levers.

Preferably, an underlying isolation frequency of the vibration isolating device according to the present invention is tuned with the corresponding vibration isolation masses Mi, the ratios xi and the stiffness of the applied elastic plates and the stiffness of springs Ki that can be arranged between locations i on the elastic plates. More specifically, increasing the stiffness of the elastic plates and/or the springs leads to a higher isolation frequency, while increasing the corresponding vibration isolation masses Mi or increasing the ratios xi at the corresponding vibration isolation masses Mi leads to a lower isolation frequency.

According to a preferred embodiment of the present invention, at least one of the first and second elastically deformable plates comprises composite material and/or metal.

According to a further preferred embodiment of the present invention, the composite material comprises a carbon fiber-reinforced polymer.

According to a further preferred embodiment of the present invention, at least one of the first and second elastically deformable plates comprises an associated vibration isolation mass.

According to a further preferred embodiment of the present invention, the associated vibration isolation mass is arranged in the region of the first and/or second curvature of the at least one of the first and second elastically deformable plates.

According to a further preferred embodiment of the present invention, the associated vibration isolation mass is arranged in a region of the at least one of the first and second elastically deformable plates that exhibits a maximum ratio between a bulging distance and a length decrease of the vibration isolating device that occurs in operation in response to an increase of the first and second curvatures during application of a compression force.

According to a further preferred embodiment of the present invention, at least one of the first and second elastically deformable plates comprises an associated lever that is mounted to the at least one of the first and second elastically deformable plates in the region of the first and/or second curvature of the at least one of the first and second elastically deformable plates.

According to a further preferred embodiment of the present invention, the associated vibration isolation mass is arranged on the associated lever in a region that exhibits a maximum ratio between a lever opening distance and a length decrease of the vibration isolating device that occurs in operation in response to an increase of the first and second curvatures during application of a compression force.

According to a further preferred embodiment of the present invention, the first elastically deformable plate comprises at least one first associated lever and the second elastically deformable plate comprises at least one second associated lever.

According to a further preferred embodiment of the present invention, the first and second associated levers are interconnected by means of at least one spring element.

According to a further preferred embodiment of the present invention, the spring element is one of a helical spring, an elastically deformable connecting plate, a diagonally arranged flat spring, a Belleville spring, a disk spring and a coned-disk spring with a connecting rod.

According to a further preferred embodiment of the present invention, the at least one spring element is arranged in a region of the first and second associated levers that exhibits a maximum ratio between a lever opening distance and a length decrease of the vibration isolating device that occurs in operation in response to an increase of the first and second curvatures during application of a compression force.

According to a further preferred embodiment of the present invention, the first and second elastically deformable plates are interconnected by means of at least one spring element.

According to a further preferred embodiment of the present invention, the spring element is one of a helical spring, an elastically deformable connecting plate, a diagonally arranged flat spring, a Belleville spring, a disk spring and a coned-disk spring with a connecting rod.

According to a further preferred embodiment of the present invention, the at least one spring element is arranged in a region of the at least one of the first and second elastically deformable plates that exhibits a maximum ratio between a bulging distance and a length decrease of the vibration isolating device that occurs in operation in response to an increase of the first and second curvatures during application of a compression force.

According to a further preferred embodiment of the present invention, the first component is a main gearbox of a helicopter and the second component is a fuselage of the helicopter.

The present invention further provides a helicopter with a first component that is elastically coupled to a second component by means of a vibration isolating device that is embodied as described above.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 1 shows a schematic view of a vibration isolating device according to a first embodiment of the invention, FIG. 2 shows a schematic view of a vibration isolating device according to a second embodiment of the invention.

DETAILED DESCRIPTION OF THE INVENTION

Figure 3A:
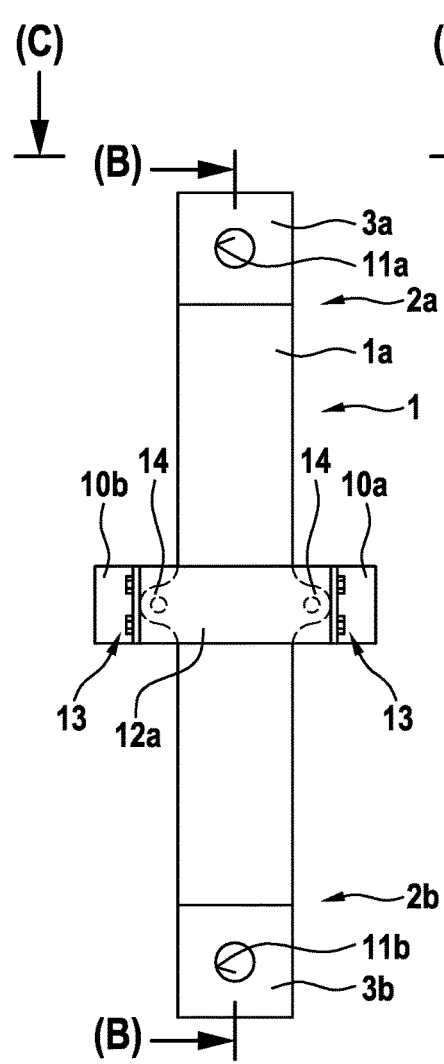
FIG. 3A shows the front view of a vibration isolating device according to the second embodiment of the invention.

FIG. 1 shows a vibration isolating device 1 according to the present invention in unloaded state, which is preferably adapted for an elastic coupling of a first component 4 to a second component 5 and for vibration isolation in predetermined frequency ranges between these first and second components 4, 5. By way of example, the first component 4 can be a main gearbox (27a in FIG. 18) of a helicopter (27 in FIG. 18) and the second component 5 can be a fuselage (27b in FIG. 18) of this helicopter (27 in FIG. 18). However, it should be noted that the vibration isolating device 1 is not limited to use in helicopters, but can instead be used in any rotary wing aircraft and in aerospace engineering in general, as well as in other technical domains, such as automotive engineering or machinery, where vibration isolation is required.

According to one aspect of the present invention, the vibration isolating device 1 comprises at least a first and a second elastically deformable plate that are attached to each other in at least two separate connecting points. Each one of these elastically deformable plates preferentially comprises a bar- or lath-shaped form with an overall length that is greater than its width. By way of example and for purposes of simplicity and clarity of the drawings, only two elastically deformable plates 1a, 1b and only two separate connecting points 2a, 2b are shown.

In other words, the present invention is described by way of example with respect to a simplified illustrative configuration that comprises only two elastically deformable plates 1a, 1b and only two separate connecting points 2a, 2b. However, it should be noted that this is not intended for restricting the present invention to such a simplified illustrative configuration.

Preferably, at least one of the two elastically deformable plates 1a, 1b comprises composite material and/or metal. The composite material may comprise a carbon fiber-reinforced polymer.

According to one aspect of the present invention, the two elastically deformable plates 1a, 1b are attached to each other in the two separate connecting points 2a, 2b for respectively defining associated bearing parts 3a, 3b. The latter are preferentially adapted for mounting to the two components 4, 5, respectively.

Preferably, each one of the elastically deformable plates comprises an associated curvature in its axial direction, i.e. its longitudinal extension, which is located between the separate connecting points. Illustratively, the elastically deformable plate 1a comprises a first curvature 2c and the elastically deformable plate 1b comprises a second curvature 2d, both curvatures 2c, 2d being located in a region between the two separate connecting points 2a, 2b.

The two curvatures 2c, 2d are preferably arranged such that a gap 2e is defined between the two elastically deformable plates 1a, 1b in the region between the two separate connecting points 2a, 2b. This gap 2e is defined such that the vibration isolating device 1 comprises in the unloaded state an underlying length 1k between the two components 4, 5 that is smaller than the overall length of each one of the elastically deformable plates 1a, 1b. Consequently, the vibration isolating device 1 comprises in the unloaded state an underlying width 1l that is greater than it would be if the two elastically deformable plates 1a, 1b would touch each other over their entire lengths.

According to one aspect of the present invention, the two curvatures 2c, 2d are adapted to be increased in operation if a compression force 6 that moves the two separate connecting points 2a, 2b towards each other is applied to the vibration isolating device 1. They are preferably further adapted to be reduced in operation if a tension force 7 that moves the two separate connecting points 2a, 2b away from each other is applied to the vibration isolating device 1.

More specifically, if the compression force 6 is applied to the vibration isolating device 1 such that the two curvatures 2c, 2d are increased, the vibration isolating device 1 is bulged out. In other words, the two elastically deformable plates 1a, 1b are forced into a bulged state as illustrated with dashed lines 9a, 9b. Consequently, the underlying length 1k of the vibration isolating device 1 is decreased by a length change $\Delta a1$, as illustrated with an arrow 6a, and its underlying width 1l is increased by a lateral displacement $\Delta b1$, as illustrated with an arrow 6b. If in contrast thereto the tension force 7 is applied to the vibration isolating device 1 such that the two curvatures 2c, 2d are decreased, the vibration isolating device 1 is flattened. In other words, the two elastically deformable plates 1a, 1b are forced into a stretched state as illustrated with dotted lines 8a, 8b. Consequently, the underlying length 1k of the vibration isolating device 1 is increased by a length change $\Delta a1$, as illustrated with an arrow 7a, and its underlying width 1l is decreased by a lateral displacement $\Delta b1$, as illustrated with an arrow 7b. As mentioned above, a ratio x1 between the lateral displacement $\Delta b1$ and the length change $\Delta a1$ can be obtained that lies in a range from $2<x1<20$.

According to one aspect of the present invention, at least one of the two elastically deformable plates 1a, 1b is provided with an associated vibration isolation mass. Illustratively, each elastically deformable plate 1a, 1b comprises an associated vibration isolation mass 1c, 1d, respectively. Each associated vibration isolation mass 1c, 1d is preferably arranged in the region of the corresponding curvature 2c, 2d of the respective elastically deformable plate 1a, 1b. By way of example, the vibration isolation mass 1c is arranged in the region of the curvature 2c and the vibration isolation mass 1d is arranged in the region of the curvature 2d.

More preferably, each associated vibration isolation mass 1c, 1d is arranged in a region of the respective elastically deformable plate 1a, 1b that exhibits the maximum ratio x1 of the vibration isolating device 1 and that preferentially occurs in operation in response to an increase of the two curvatures 2c, 2d during application of the compression force 6. This maximum ratio x1 can be determined between the lateral displacement Δb1 in direction of the arrow 6b, which is also referred to hereinafter as the "bulging distance", and the length change Δa1 in direction of the arrow 6a, which is also referred to hereinafter as the "length decrease". Accordingly, in the illustrated example the vibration isolation masses 1c, 1d are arranged approximately in the middle of the vibration isolating device 1, seen in direction of its underlying length 1k, where the maximum ratio x1 occurs in operation.

FIG. 2 shows the vibration isolating device 1 of FIG. 1, wherein according to one aspect of the present invention now at least one spring element is provided for interconnecting the two elastically deformable plates 1a, 1b. By way of example, the two elastically deformable plates 1a, 1b are interconnected by means of two spring elements 10a, 10b, which are preferably embodied as helical springs. However, other realizations are likewise contemplated, such as e.g. an elastically deformable connecting plate (e.g. 21a in FIG. 11), a diagonally arranged flat spring, a Belleville spring, a disk spring or a coned-disk spring with a connecting rod, and so on.

According to one aspect of the present invention, the two spring elements 10a, 10b are arranged in the region of the respective elastically deformable plate 1a, 1b that exhibits the maximum ratio x1 of the vibration isolating device 1 and that preferentially occurs in operation as explained above with reference to FIG. 1. More specifically, as this maximum ratio x1 occurs at the location of the vibration isolation masses 1c, 1d as explained above with reference to FIG. 1, the two spring elements 10a, 10b are preferably respectively attached to the two vibration isolation masses 1c, 1d for interconnecting the two elastically deformable plates 1a, 1b.

Figure 3B:
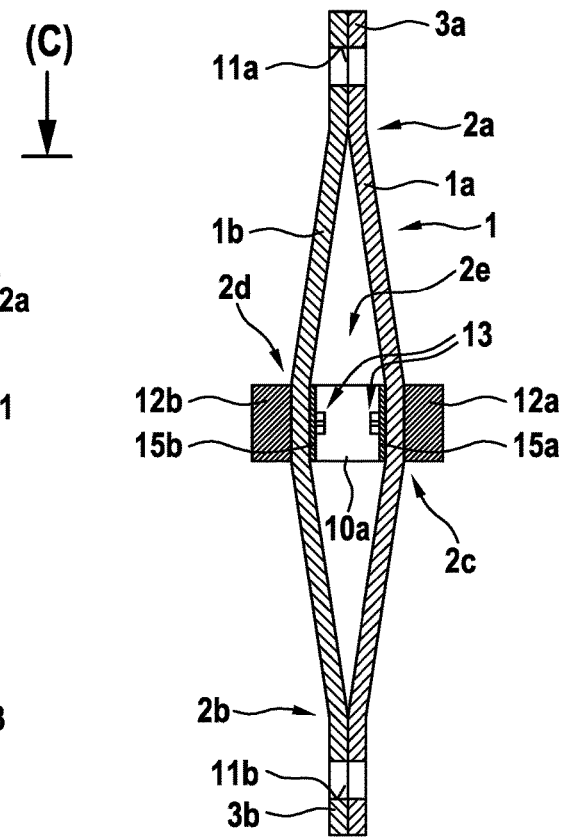
FIG. 3B shows the sectional view of a vibration isolating device according to the second embodiment of the invention.
Figure 3C:
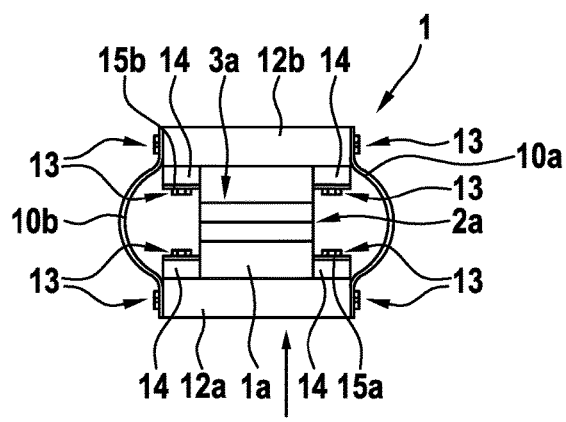
FIG. 3C shows the top view of a vibration isolating device according to the second embodiment of the invention.

FIGS. 3A-3C show an exemplary realization of the vibration isolating device 1 according to FIG. 2. More specifically, FIG. 3A shows the vibration isolating device 1 in front view, FIG. 3B in sectional view and FIG. 3C in top view to further illustrate the above-described bar- or lath-shaped configuration of the two elastically deformable plates 1a, 1b. In this exemplary realization, the bearing parts 3a, 3b of the vibration isolating device 1 are illustratively embodied as bearing laminates with mounting openings 11a, 11b, which are adapted for mounting of the vibration isolating device 1 to the two components 4, 5 of FIG. 2.

According to one aspect of the present invention, the two elastically deformable plates 1a, 1b are rigidly attached to associated mounting flanges 12a, 12b, respectively, which preferably essentially define the vibration isolation masses 1c, 1d of FIG. 2. The rigid attachment is exemplarily performed by means of suitable fixation means 13, such as screws or bolts, at lateral extensions 14 of the two elastically deformable plates 1a, 1b, preferentially via associated blocking plates 15a, 15b, respectively.

As the associated mounting flanges 12a, 12b preferably essentially define the vibration isolation masses 1c, 1d of FIG. 2, they are interconnected according to FIG. 2 by means of the two spring elements 10a, 10b. The latter are illustratively embodied as diagonally arranged flat springs in the form of thin curved plates, as best seen from part (C). Preferably, these diagonally arranged flat springs are also rigidly attached to the associated mounting flanges 12a, 12b by means of suitable fixation means 13, such as screws or bolts.

According to one aspect of the present invention, the diagonally arranged flat springs exhibit a progressive stiffness, which preferentially increases during extension. Furthermore, the diagonally arranged flat springs preferably function as limits stops whenever the vibration isolating device 1 is subject to comparatively large compression forces in operation, i.e. when the compression force 6 of FIG. 1 exceeds a predetermined threshold.

Figure 4:
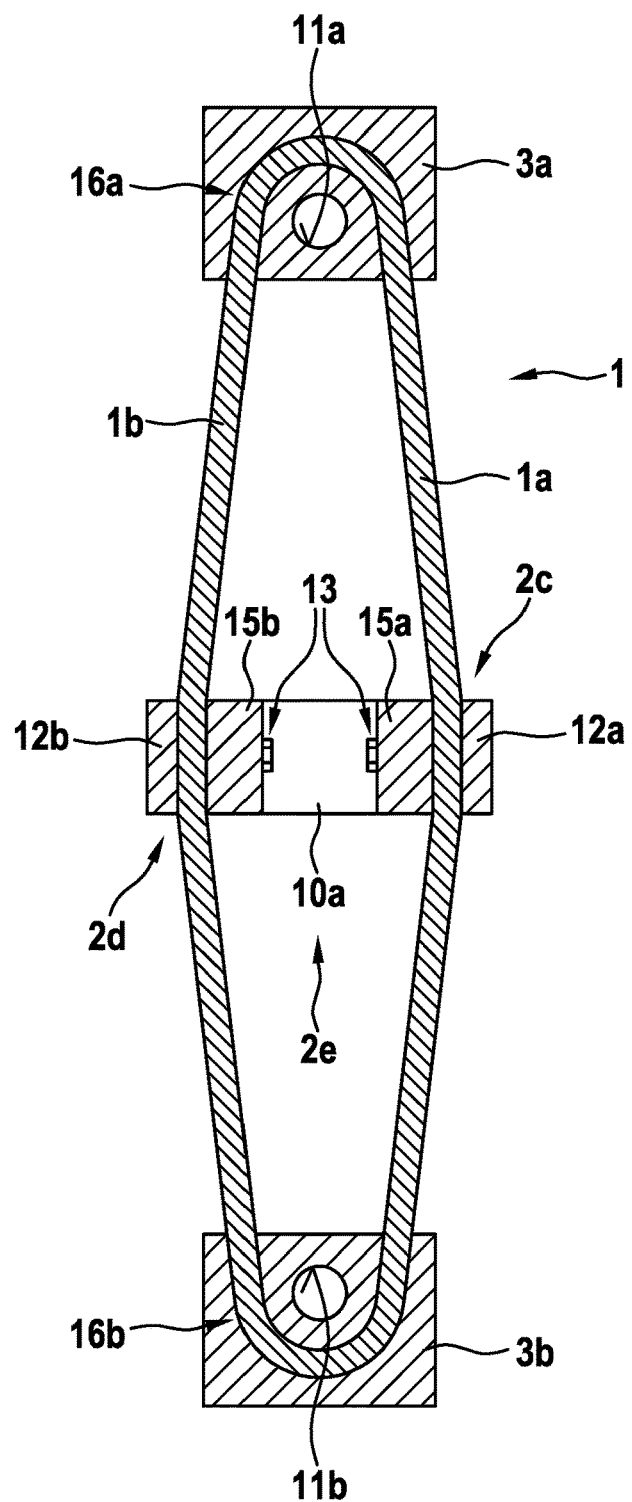
FIG. 4 shows a sectional view of the vibration isolating device of FIGS. 3A-3C with plate loops according to one aspect of the invention.

FIG. 4 shows the vibration isolating device 1 according to FIGS. 3A-3C with the two elastically deformable plates 1a, 1b that define the bearing parts 3a, 3b with the mounting openings 11a, 11b, respectively. However, in contrast to FIGS. 3A-3C, where the bearing parts 3a, 3b are implemented as bearing laminates, they are now implemented by means of plate loops 16a, 16b, respectively. Consequently, the two elastically deformable plates 1a, 1b now preferably define a single integrated component.

Figure 5:
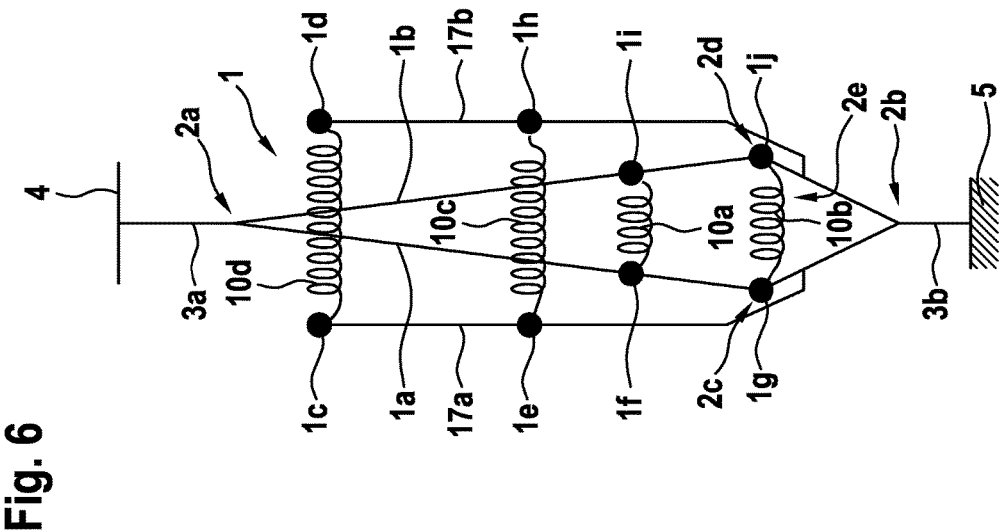
FIG. 5 shows a schematic view of a vibration isolating device according to a third embodiment of the invention.

FIG. 5 shows the vibration isolating device 1 of FIG. 1, wherein according to one aspect of the present invention now at least one of the two elastically deformable plates 1a, 1b comprises an associated lever that is mounted to the at least one of the two elastically deformable plates 1a, 1b in the region of its curvature 2c, 2d. By way of example, each one of the two elastically deformable plates 1a, 1b is provided with a lever 17a, 17b, wherein the lever 17a is mounted to the plate 1a at its curvature 2c, while the lever 17b is mounted to the plate 1b at its curvature 2d. The levers 17a, 17b can be implemented as integral parts of the two elastically deformable plates 1a, 1b, respectively, or as separate components.

It should be noted that the curvatures 2c, 2d are slightly modified with respect to FIG. 1 in order to allow for a sufficient length of the levers 17a, 17b. More specifically, in FIG. 1 the curvatures 2c, 2d are provided such that the gap 2e of FIG. 1 is maximal at least approximately in the middle of the vibration isolating device 1, seen in direction of its underlying length 1k of FIG. 1. In contrast thereto, the gap 2e is now maximal in unloaded state of the vibration isolating device 1 at a location that is comparatively close to the component 5 and the levers 17a, 17b are connected to the two elastically deformable plates 1a, 1b at this location and have, consequently, free ends that point towards the component 4. However, it should be noted that this configuration could likewise be mirrored so that the free ends of the levers 17a, 17b would point towards the component 5.

In operation of the vibration isolating device 1, if the compression force 6 of FIG. 1 is applied to the vibration isolating device 1 such that the two curvatures 2c, 2d are increased, the vibration isolating device 1 is bulged out and the levers 17a, 17b are moved outwardly. In other words, the two elastically deformable plates 1a, 1b are forced into a bulged state and consequently, the underlying length 1k of the vibration isolating device 1 as illustrated in FIG. 1 is decreased by a length change Δa5, as illustrated with the arrow 6a of FIG. 1, its underlying width 1l as illustrated in FIG. 1 is increased by a lateral displacement Δb5p, as illustrated with the arrow 6b of FIG. 1, and the levers 17a, 17b perform an outwardly directed lateral displacement Δb5l, as illustrated with the arrows 18a. If in contrast thereto the tension force 7 of FIG. 1 is applied to the vibration isolating device 1 such that the two curvatures 2c, 2d are decreased, the vibration isolating device 1 is flattened and the levers 17a, 17b are moved inwardly. In other words, the two elastically deformable plates 1a, 1b are forced into a stretched state and, consequently, the underlying length 1k of the vibration isolating device 1 as illustrated in FIG. 1 is increased by a length change Δa5, as illustrated with the arrow 7a of FIG. 1, its underlying width 1l as illustrated in FIG. 1 is decreased by a lateral displacement Δb5p, as illustrated with the arrow 7b of FIG. 1, and the levers 17a, 17b perform an inwardly directed lateral displacement Δb5l, as illustrated with the arrows 18b.

As mentioned above with reference to FIG. 1, a ratio x5p that can be obtained with respect to the two elastically deformable plates 1a, 1b between the lateral displacement Δb5p and the length change Δa5 lies in a range from 2<x5p<20. However, a ratio x5l that can be obtained with respect to the two levers 17a, 17b between the lateral displacement Δb5l and the length change Δa5 preferably lies in a range from 2<x5l<50. In other words, the two levers 17a, 17b amplify the lateral displacements Δb so that Δb5l>Δb5p.

According to one aspect of the present invention, at least one and, preferentially, each one of the levers 17a, 17b is provided with an associated vibration isolation mass. By way of example, the lever 17a is provided with the vibration isolation mass 1c of FIG. 1 and the lever 17b is provided with the vibration isolation mass 1d of FIG. 1. Preferably, each associated vibration isolation mass is arranged on the corresponding lever in a region that exhibits a maximum ratio x5l between the lateral displacement Δb5l of this lever in direction of the arrow 18a, which is also referred to hereinafter as the "lever opening distance", and the length change Δa5 in direction of the arrow 6a, which is also referred to hereinafter as the "length decrease" of the vibration isolating device 1 and that occurs in operation in response to an increase of the curvatures 2c, 2d during application of the compression force 6 of FIG. 1. Accordingly, in the illustrated example the vibration isolation masses 1c, 1d are arranged at the free ends of the levers 17a, 17b, respectively, where the maximum ratio x5l occurs in operation.

Figure 6:
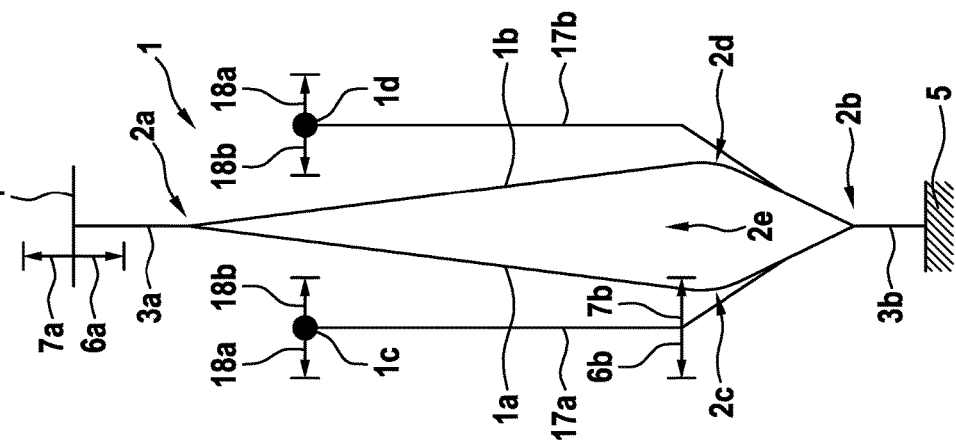
FIG. 6 shows a schematic view of a vibration isolating device according to a fourth embodiment of the invention.

FIG. 6 shows the vibration isolating device 1 of FIG. 5, wherein according to one aspect of the present invention now at least one spring element is provided for interconnecting the two levers 17a, 17b. By way of example, the two levers 17a, 17b are interconnected by means of a spring element 10d, which is preferably embodied as a helical spring. However, as already mentioned above, other realizations are likewise contemplated, such as e.g. an elastically deformable connecting plate (e.g. 21a in FIG. 11), a diagonally arranged flat spring, a Belleville spring, a disk spring or a coned-disk spring with a connecting rod, and so on.

According to one aspect of the present invention, the spring element 10d is arranged in the region of the respective lever 17a, 17b that exhibits the maximum ratio x5l of the vibration isolating device 1 and that preferentially occurs in operation as explained above with reference to FIG. 5. More specifically, as this maximum ratio x5l occurs at the location of the vibration isolation masses 1c, 1d as explained above with reference to FIG. 5, the spring element 10d is preferably respectively attached to the two vibration isolation masses 1c, 1d for interconnecting the two levers 17a, 17b.

FIG. 6 further illustrates that the levers 17a, 17b can be provided in an application-specific manner with additional vibration isolation masses and that they can be interconnected by additional spring elements, and that optionally also the two elastically deformable plates 1a, 1b can be provided with vibration isolation masses and interconnecting spring elements. By way of example, the levers 17a, 17b are provided with additional vibration isolation masses 1e, 1h, respectively, which are interconnected by means of an additional spring element 10c. Furthermore, the two elastically deformable plates 1a, 1b are illustratively provided with optional vibration isolation masses 1f, 1g and 1h, 1j, respectively, wherein the vibration isolation masses 1f, 1i are exemplarily interconnected by means of the spring element 10a of FIG. 2 and wherein the vibration isolation masses 1g, 1j are exemplarily interconnected by means of a spring element 10b, which can be embodied in the same manner as the spring element 10a.

Figure 7:
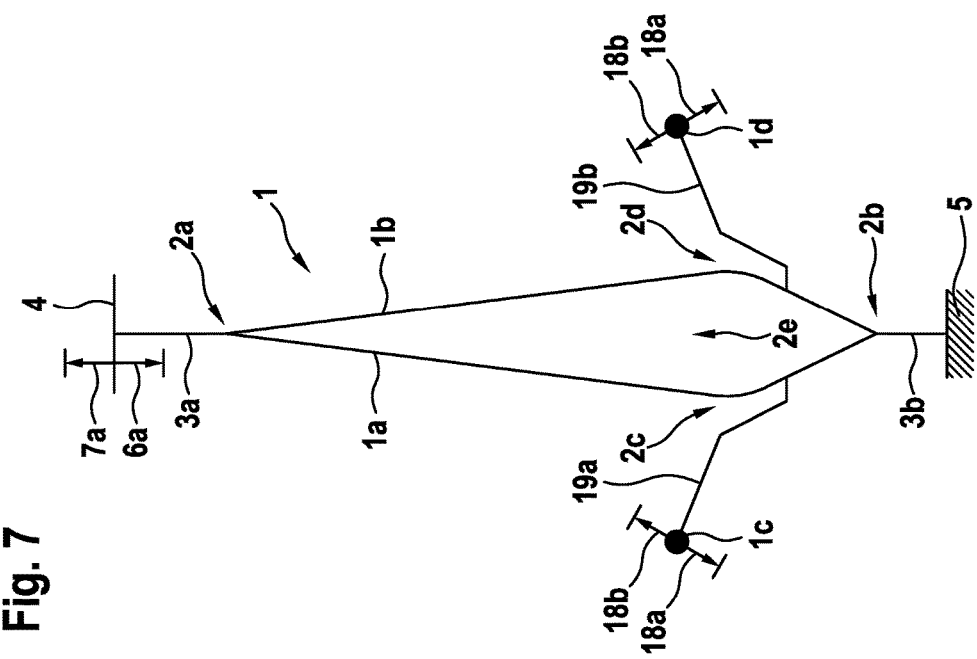
FIG. 7 shows a schematic view of a vibration isolating device according to a fifth embodiment of the invention.

FIG. 7 shows the vibration isolating device 1 of FIG. 5, which according to one aspect of the present invention now comprises two levers 19a, 19b. In contrast to the levers 17a, 17b of FIG. 5, the two levers 19a, 19b are kinked outwardly.

However, it should be noted that this configuration is dependent on space that is available in an associated operating environment for an installation of this vibration isolating device 1. In other words, the kinks may be directed in other directions or just be implemented smoother than illustrated.

Figure 8:
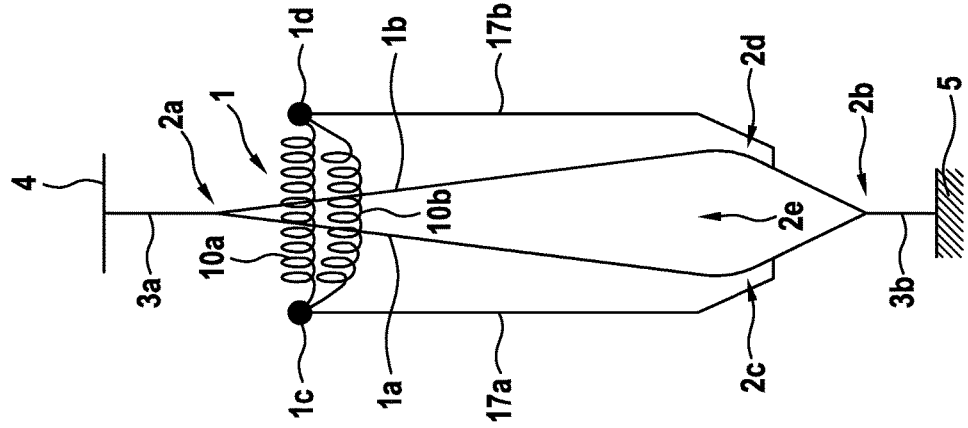
FIG. 8 shows a schematic view of a vibration isolating device according to a sixth embodiment of the invention.

FIG. 8 shows the vibration isolating device 1 of FIG. 5 with the two levers 17a, 17b, which are provided with the associated vibration isolation masses 1c, 1d, respectively. However, in contrast to FIG. 5 the two vibration isolation masses 1c, 1d are now interconnected by means of the spring elements 10a, 10b of FIG. 6.

Figure 9:
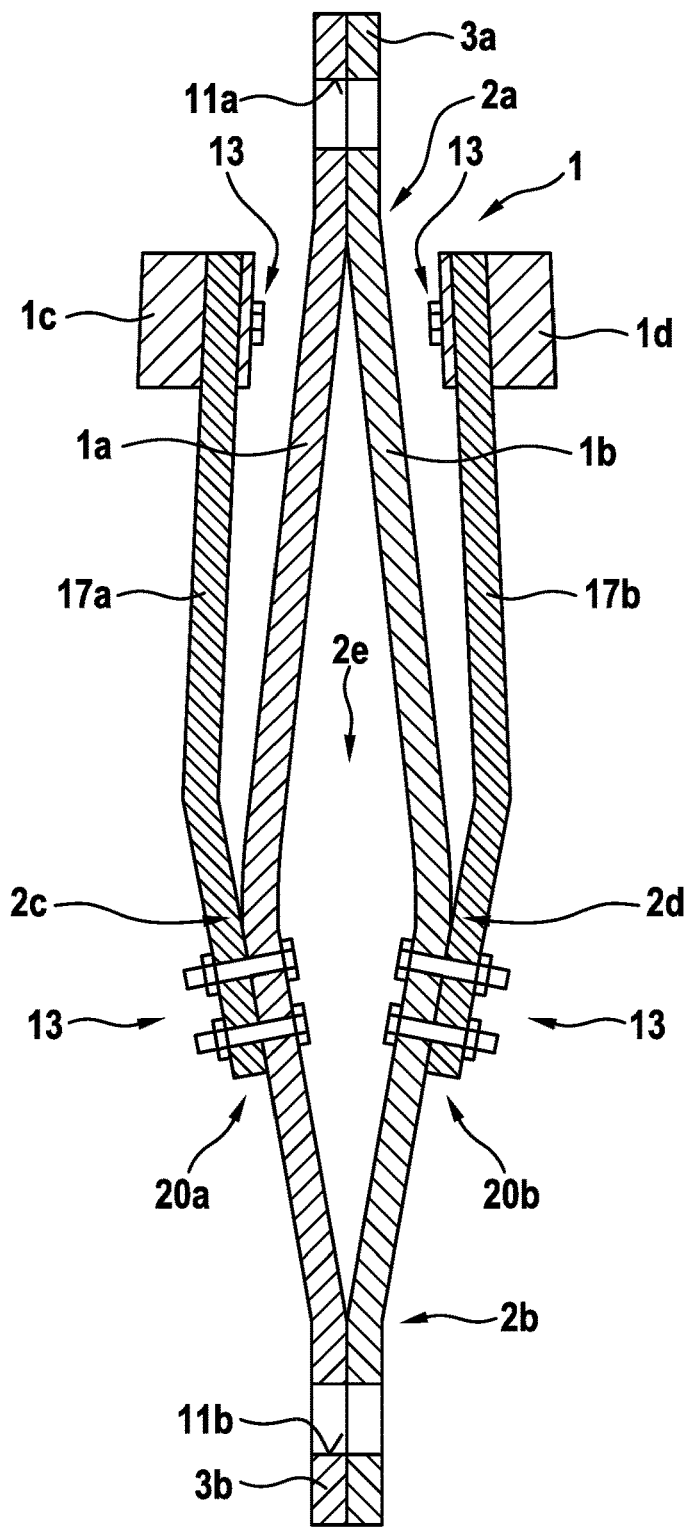
FIG. 9 shows a sectional view of a vibration isolating device according to the third embodiment of the invention.

FIG. 9 shows an exemplary realization of the vibration isolating device 1 with the two elastically deformable plates 1a, 1b and the two levers 17a, 17b according to FIG. 5 to further illustrate a preferred bar- or lath-shaped configuration of these two levers 17a, 17b and the two elastically deformable plates 1a, 1b. In this exemplary realization, the bearing parts 3a, 3b of the vibration isolating device 1 are illustratively embodied as bearing laminates with the mounting openings 11a, 11b of FIGS. 3A-3B, which are adapted for mounting of the vibration isolating device 1 to the two components 4, 5 of FIG. 5.

According to one aspect of the present invention, the two levers 17a, 17b are separate components that are rigidly attached to the two elastically deformable plates 1a, 1b at associated connection sections 20a, 20b, respectively, which are arranged in the regions of the curvatures 2c, 2d. The rigid attachment is exemplarily performed by means of the suitable fixation means 13 of FIG. 3C, such as screws or bolts.

Preferably, the two levers 17a, 17b are connected with the vibration isolation masses 1c, 1d, respectively, which are preferentially rigidly attached to the two levers 17a, 17b. This rigid attachment is exemplarily also performed by means of the suitable fixation means 13, such as screws or bolts.

Figure 10B:
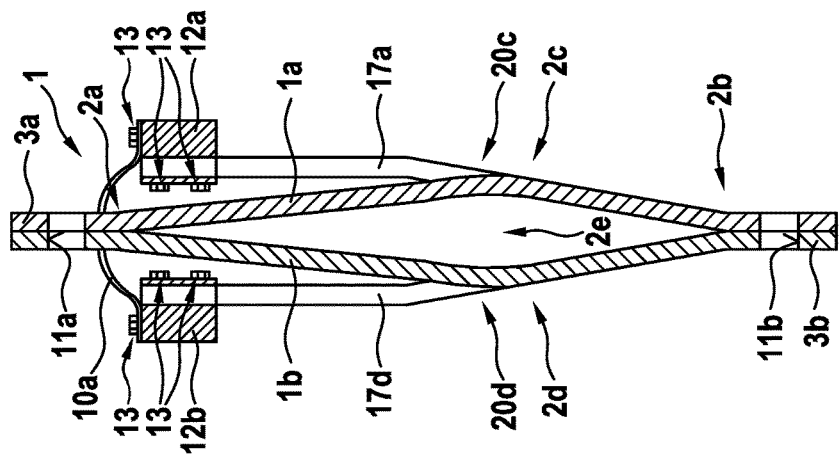
FIG. 10B shows the sectional view of a vibration isolating device according to the sixth embodiment of the invention.
Figure 10A:
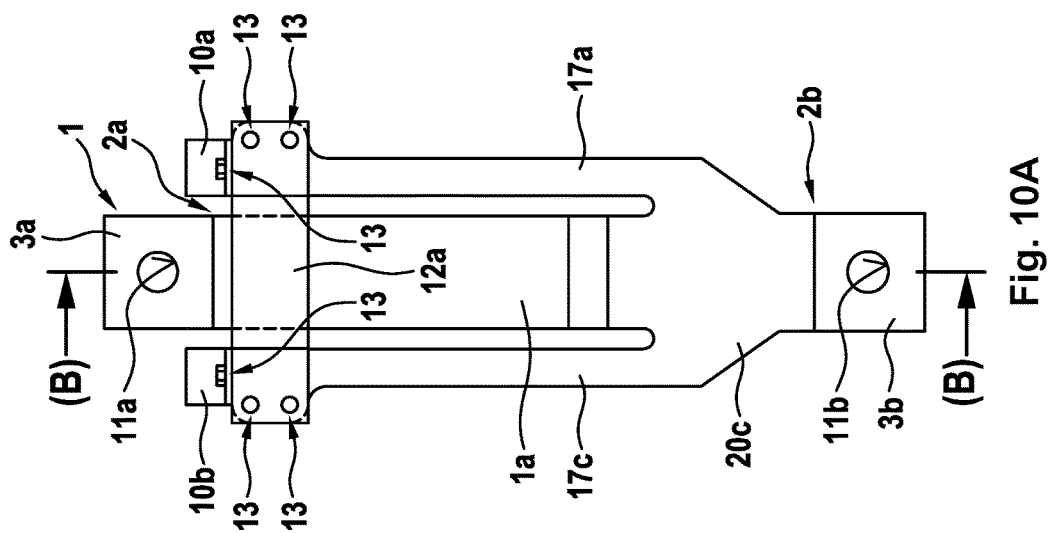
FIG. 10A shows the front view of a vibration isolating device according to the sixth embodiment of the invention.

FIGS. 10A and 10B shown an exemplary realization of the vibration isolating device 1 with the two elastically deformable plates 1a, 1b and the two levers 17a, 17b according to FIG. 8, as well as with two additional levers 17c, 17d. More specifically, FIG. 10A shows the vibration isolating device 1 in front view and FIG. 10B in sectional view to further illustrate a preferred bar- or lath-shaped configuration of the four levers 17a, 17b, 17c, 17d and the two elastically deformable plates 1a, 1b. In this exemplary realization, the bearing parts 3a, 3b of the vibration isolating device 1 are again illustratively embodied as bearing laminates with the mounting openings 11a, 11b of FIGS. 3A-3B, which are adapted for mounting of the vibration isolating device 1 to the two components 4, 5 of FIG. 8.

The four levers 17a, 17b, 17c, 17d are illustratively arranged laterally with respect to the two elastically deformable plates 1a, 1b and formed as integral parts thereof. Thus, the lever 17b is hidden in FIG. 10A by the lever 17c and the lever 17d is hidden in FIG. 10A by the lever 17a. Alternatively, the levers 17a, 17c and 17b, 17d could respectively be combined to single levers according to FIG. 9, for instance.

According to one aspect of the present invention, the levers 17a, 17c and the levers 17b, 17d are respectively rigidly attached to each other at their free ends via the mounting flanges 12a, 12b of FIG. 3B. Furthermore, the levers 17a, 17d and the levers 17b, 17c are respectively interconnected via the mounting flanges 12a, 12b by means of the spring elements 10a, 10b. However, as the rigid attachment of the mounting flanges 12a, 12b and the spring elements 10a, 10b is at least similar to what is described above with reference to FIGS. 3A-3C, a more detailed description thereof is omitted here for brevity and conciseness.

Figure 11:
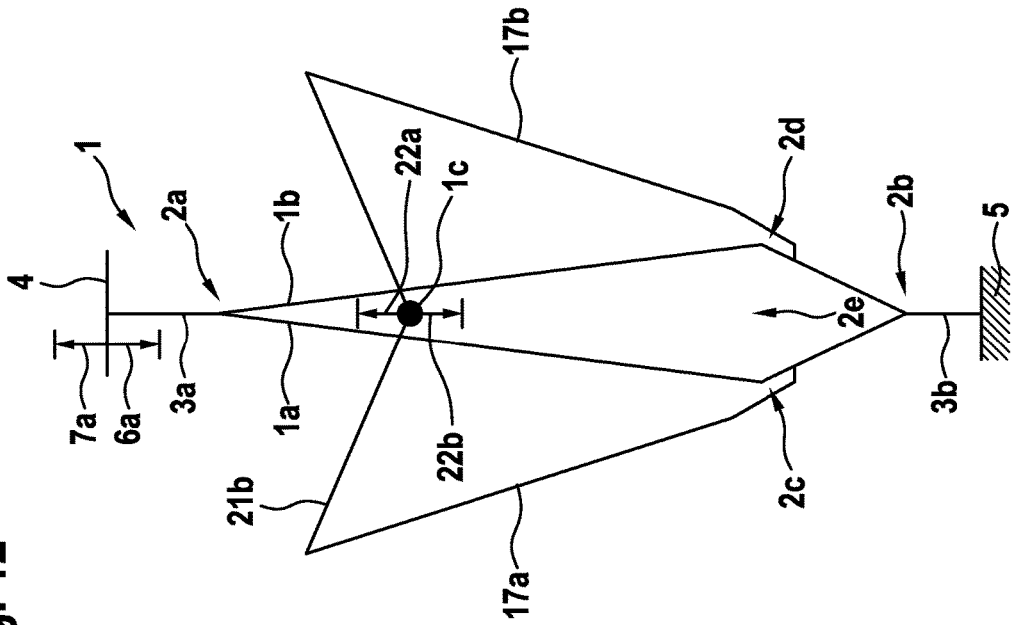
FIG. 11 shows a schematic view of a vibration isolating device according to a seventh embodiment of the invention.

FIG. 11 shows the vibration isolating device 1 of FIG. 1, wherein according to one aspect of the present invention now at least one spring element in the form of an elastically deformable connecting plate 21a is provided for interconnecting the two elastically deformable plates 1a, 1b. By way of example, the two elastically deformable plates 1a, 1b are interconnected by means of this elastically deformable connecting plate 21a at a location, where the gap 2e of FIG. 1 is maximal in unloaded state of the vibration isolating device 1.

According to one aspect of the present invention, the two elastically deformable plates 1a, 1b and the elastically deformable connecting plate 21a are manufactured in one piece, i.e. as an integral component. Alternatively, the elastically deformable connecting plate 21a can be a separate component that is rigidly attached to the elastically deformable plates 1a, 1b.

Preferably, the elastically deformable connecting plate 21a is provided with the vibration isolation mass 1c of FIG. 1. The latter is at least approximately arranged at a central position of the elastically deformable connecting plate 21a, which corresponds to a position of a maximum ratio x11. This maximum ratio x11 can be determined according to what is described above, so that a more detailed description of this determination can be omitted for brevity and conciseness.

According to one aspect of the present invention, while the elastically deformable plates 1a, 1b perform lateral displacements Δb1 as described above with reference to FIG. 1, the elastically deformable connecting plate 21a is adapted and arranged to perform longitudinal displacements Δb11, as illustrated with arrows 22a, 22b. The arrow 22a exemplarily illustrates the longitudinal displacement Δb11 that is performed by the elastically deformable connecting plate 21a if the compression force 6 of FIG. 1 is applied to the vibration isolating device 1, and the arrow 22b exemplarily illustrates the longitudinal displacement Δb11 that is performed by the elastically deformable connecting plate 21a if the tension force 7 of FIG. 1 is applied to the vibration isolating device 1. Preferably, these longitudinal displacements Δb11 are greater than the lateral displacements Δb1 according to FIG. 1, i.e. Δb11>Δb1.

Figure 12:
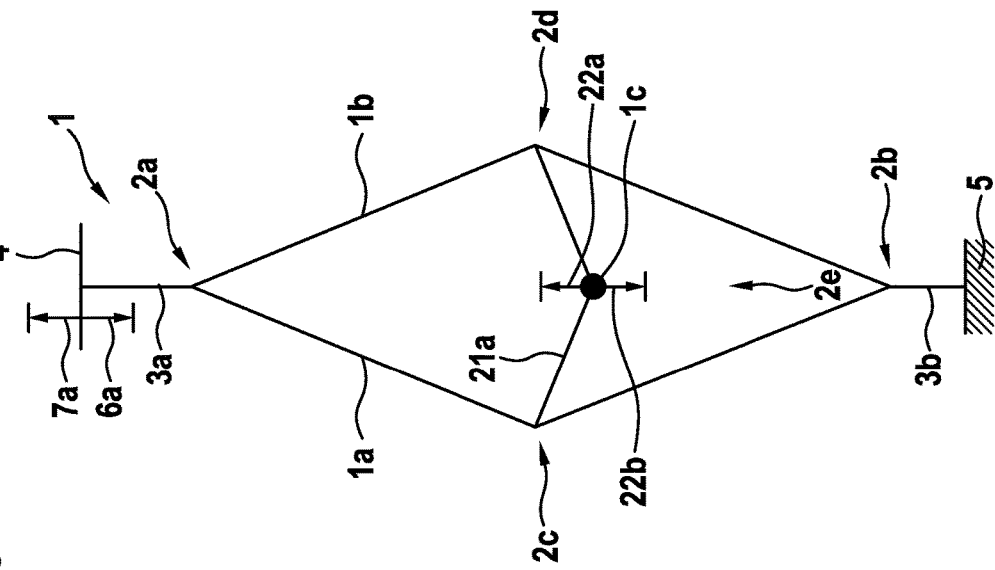
FIG. 12 shows a schematic view of a vibration isolating device according to an eighth embodiment of the invention.

FIG. 12 shows the vibration isolating device 1 of FIG. 5 with the two elastically deformable plates 1a, 1b and the two levers 17a, 17b. However, in contrast to FIG. 5 the free ends of the levers 17a, 17b are no more provided with the vibration isolation masses 1c, 1d of FIG. 5, but are instead interconnected by means of an elastically deformable connecting plate 21b. The latter is provided with the vibration isolation mass 1c, similar to the elastically deformable connecting plate 21a of FIG. 11.

According to one aspect of the present invention, the two levers 17a, 17b and the elastically deformable connecting plate 21b are manufactured in one piece, i.e. as an integral component. Alternatively, the elastically deformable connecting plate 21b can be a separate component that is rigidly attached to the free ends of the two levers 17a, 17b.

Figure 13:
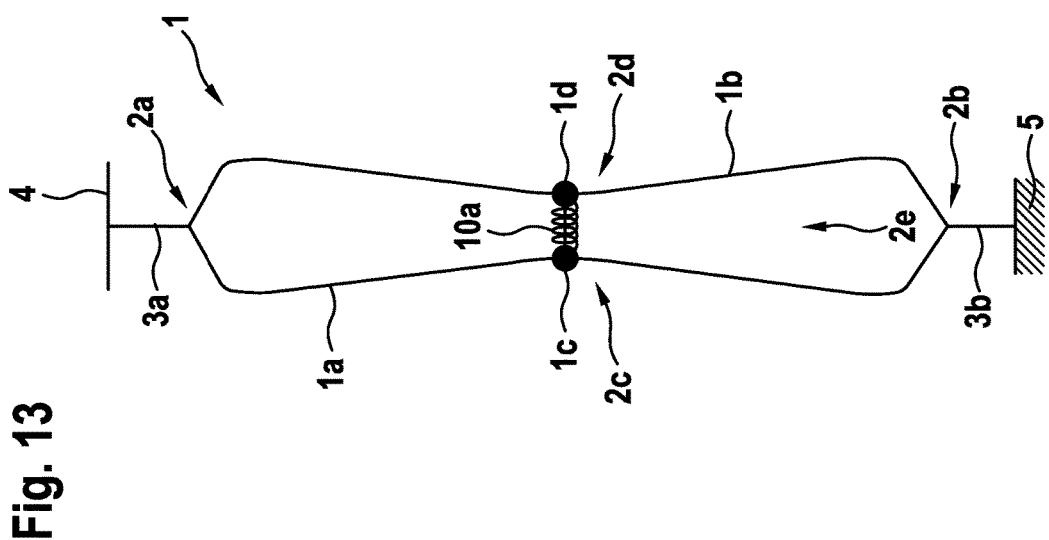
FIG. 13 shows a schematic view of a vibration isolating device according to a ninth embodiment of the invention.

FIG. 13 shows the vibration isolating device 1 of FIG. 2 with the two elastically deformable plates 1a, 1b and the two vibration isolation masses 1c, 1d, which are interconnected by means of the spring element 10a of FIG. 2. However, in contrast to FIG. 2 the curvatures 2c, 2d of the two elastically deformable plates 1a, 1b are now such that the vibration isolating device 1 illustratively exhibits a bi-concave shape in cross section, instead of a bi-convex shape as illustrated in FIG. 2. Such a shaping provides advantageous limit stops if comparatively high compression forces are applied to the vibration isolating device 1.

Figure 14:
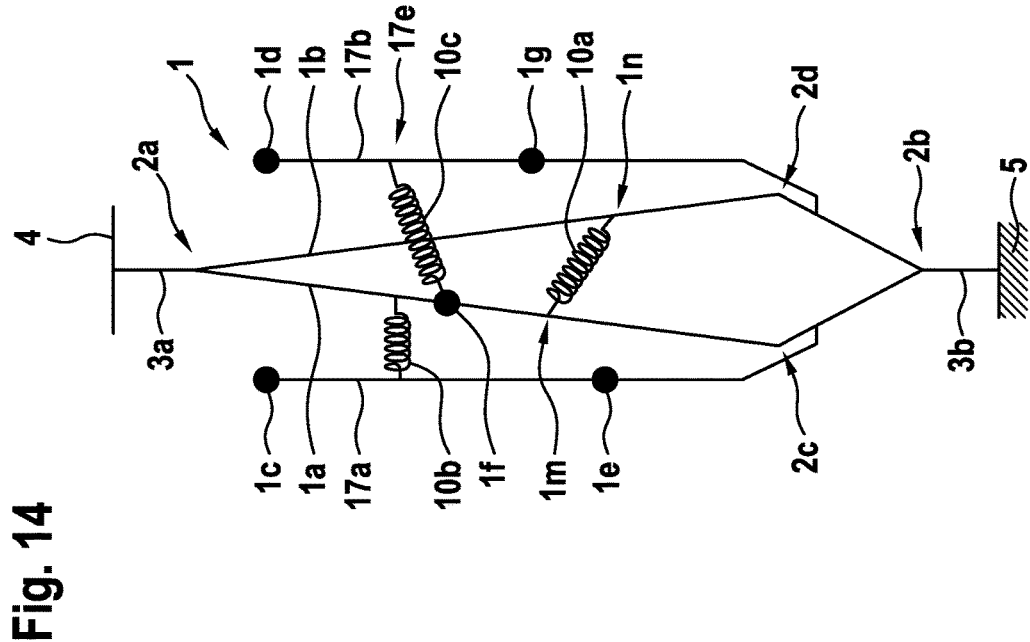
FIG. 14 shows a schematic view of a vibration isolating device according to a tenth embodiment of the invention.

FIG. 14 shows the vibration isolating device 1 of FIG. 5 with the two elastically deformable plates 1a, 1b and the two levers 17a, 17b. According to one aspect of the present invention, the two levers 17a, 17b are provided with the vibration isolation masses 1c, 1e and 1d, 1g of FIG. 6, respectively, and only the elastically deformable plate 1a is provided with the vibration isolation mass 1f. However, these vibration isolation masses 1c, 1e, 1d, 1g and 1f are not arranged symmetrically on the two levers 17a, 17b and the elastically deformable plate 1a.

Furthermore, the vibration isolating device 1 can be provided with spring elements that are also not necessarily arranged symmetrically on the vibration isolating device 1 and that may arbitrarily connect selected components. For instance, the spring element 10a of FIG. 6 connects the two elastically deformable plates 1a, 1b merely at associated plate-spring connecting points 1m, 1n and is illustratively arranged obliquely within the vibration isolating device 1. Furthermore, the spring element 10b of FIG. 6 connects the lever 17a to the elastically deformable plate 1a independent on any associated vibration isolation masses. Finally, the spring element 10c of FIG. 6 connects the lever 17b to the elastically deformable plate 1b from the vibration isolation mass 1f that is associated with the elastically deformable plate 1b to a lever-spring connecting point 17e that is provided independent on any associated vibration isolation masses on the lever 17b.

Figure 15:
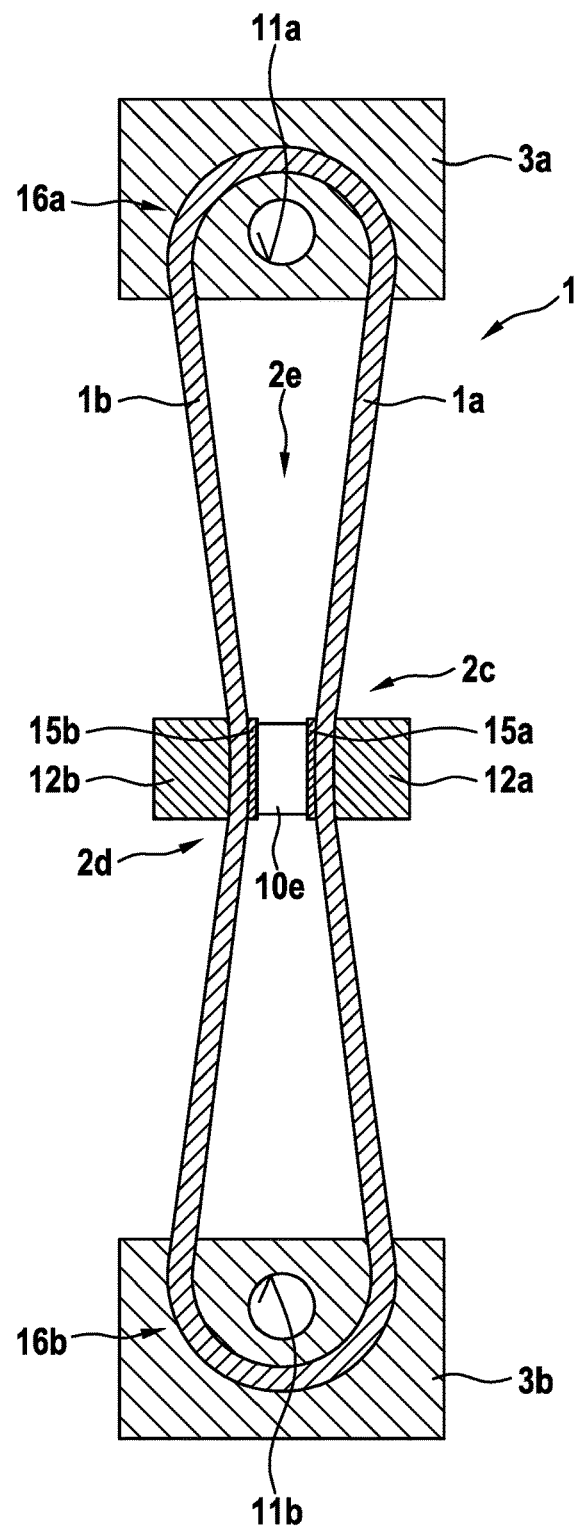
FIG. 15 shows a sectional view of a vibration isolating device according to the ninth embodiment of the invention.

FIG. 15 shows an exemplary realization of the vibration isolating device 1 according to FIG. 13 for further illustrating its bi-concave shape in cross section. However, as the vibration isolating device 1 of FIG. 15 is otherwise similar to the one of FIG. 4, a more detailed description thereof is omitted for brevity and conciseness.

Figure 16:
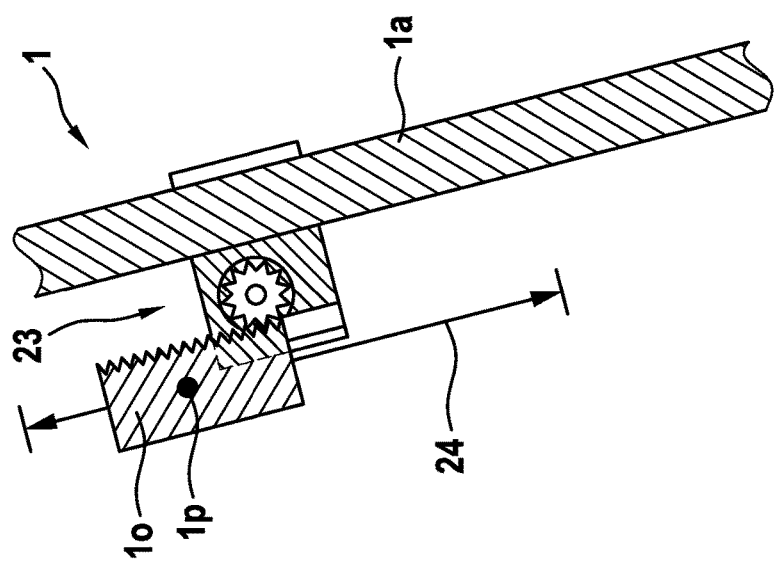
FIG. 16 shows a schematic view of an arrangement for adjustment of an adjustable vibration isolation mass according to one embodiment of the invention.

FIG. 16 shows a first arrangement that is suitable for adjusting the weight, i.e. center of gravity 1p, of an adjustable vibration isolation mass 1o that is illustratively associated with the elastically deformable plate 1a of FIG. 1. According to one aspect of the present invention, the weight adjustment is achieved by a translational movement of the center of gravity 1p of the adjustable vibration isolation mass 1o, as indicated with an arrow 24. Such a translational movement can e.g. be imposed on the adjustable vibration isolation mass 1o by means of a correspondingly configured drive unit 23 in the form of a linear drive. However, such a drive unit is well-known to the person skilled in the art and, therefore, not described in further detail for brevity and conciseness.

Figure 17:
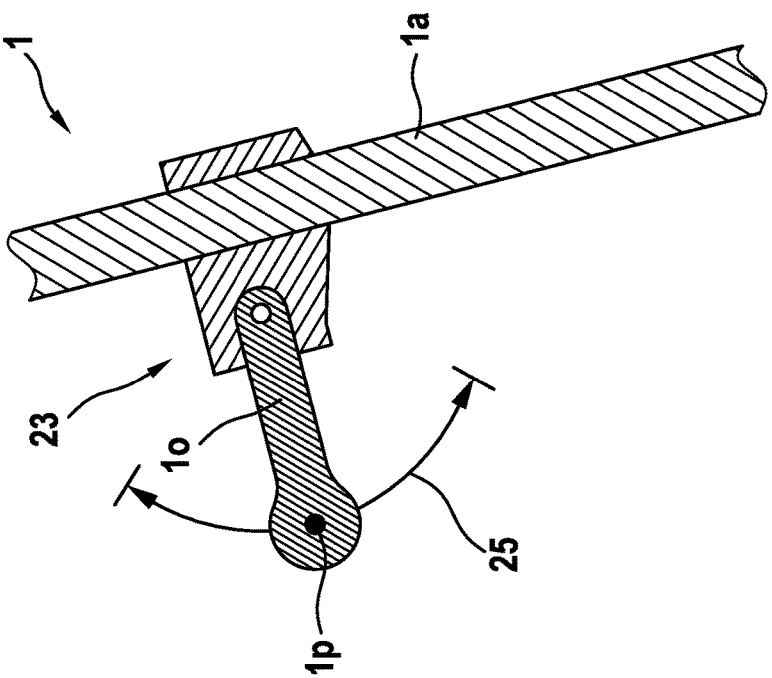
FIG. 17 shows a schematic view of an arrangement for adjustment of an adjustable vibration isolation mass according to another embodiment of the invention.

FIG. 17 shows a second arrangement that is suitable for adjusting the weight, i.e. center of gravity 1p, of the adjustable vibration isolation mass 1o of FIG. 16 that is illustratively associated with the elastically deformable plate 1a of FIG. 1. According to one aspect of the present invention, the weight adjustment is now achieved in contrast to FIG. 16 by a rotational movement of the center of gravity 1p of the adjustable vibration isolation mass 1o, as indicated with an arrow 25. Such a rotational movement can e.g. be imposed on the adjustable vibration isolation mass 1o by means of the correspondingly configured drive unit 23 of FIG. 16 in the form of a rotational drive with an eccentric center of gravity.

Figure 18:
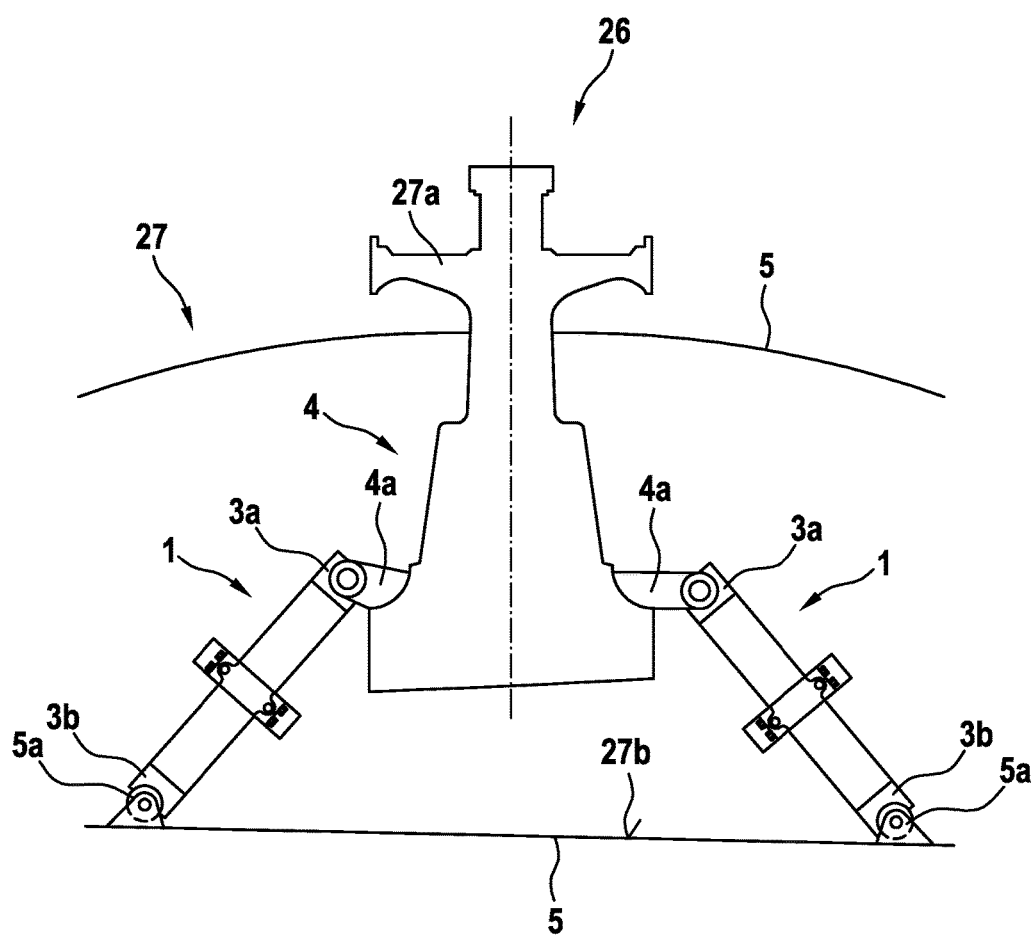
FIG. 18 shows a schematic view of a helicopter that is provided with vibration isolating devices according to the invention.

FIG. 18 shows a vibration isolated arrangement 26 for illustrating an exemplary application environment of at least one vibration isolating device 1 as described above with respect to any one of the preceding figures. More specifically, according to FIG. 18, at least one vibration isolating device 1 is used to connect a main gear box 27a of a helicopter 27 to a fuselage 27b of the helicopter. Illustratively, two vibration isolating devices 1 are used and, preferably, three or more such vibration isolating devices 1 are used.

By way of example, each vibration isolating device 1 is rigidly attached to a component joint 4a provided at the main gear box 27a via its bearing part 3a, e.g. by means of screws or bolts. Furthermore, each vibration isolating device 1 is rigidly attached to a component joint 5a provided at the fuselage 27b via its bearing part 3b, e.g. by means of screws or bolts. Thus, vibration isolation can be achieved between the main gear box 27a and the fuselage 27b.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention. For instance, while in FIG. 16 and FIG. 17 adjustable vibration isolation masses are illustrated; also the spring elements described above can be adjustable. By way of example, correspondingly configured drive units can be used for changing a respective pre-tension and/or correspondingly provided free end lengths thereof, and so on.

What is claimed is:

1. A vibration isolating device that is adapted for an elastic coupling of a first component to a second component and for vibration isolation in predetermined frequency ranges between the first and second components, the vibration isolating device comprising at least a first and a second elastically deformable plate that are attached to each other in at least two separate connecting points, the first elastically deformable plate comprising a first curvature located in a region between the at least two separate connecting points and the second elastically deformable plate comprising a second curvature located in a region between the at least two separate connecting points, wherein the first and second curvatures are arranged such that a gap is defined between the first and second elastically deformable plates in the regions between the at least two separate connecting points, and wherein the first and second curvatures are adapted to be reduced in operation if a tension force that moves the at least two separate connecting points away from each other is applied to the vibration isolating device, and wherein the first and second curvatures are adapted to be increased in operation if a compression force that moves the at least two separate connecting points towards each other is applied to the vibration isolating device; wherein at least one of the first and second elastically deformable plates comprises an associated vibration isolation mass and in that the at least one of the first and second elastically deformable plates comprises an associated lever that is mounted to the at least one of the first and second elastically deformable plates, in the region of at least one of the first and second curvatures, of the at least one of the first and second elastically deformable plates, at least one associated lever being provided with a vibration isolation mass.

2. The vibration isolating device according to claim 1, wherein at least one of the first and second elastically deformable plates comprises at least one of composite material and metal.

3. The vibration isolating device according to claim 2, wherein the composite material comprises a carbon fiber-reinforced polymer.

4. The vibration isolating device according to claim 1, wherein the associated vibration isolation mass is arranged in the region of at least one of the first and second curvatures, of the at least one of the first and second elastically deformable plates.

5. The vibration isolating device according to claim 1, wherein the associated vibration isolation mass is arranged in a region of the at least one of the first and second elastically deformable plates that exhibits a maximum ratio between a bulging distance and a length decrease of the vibration isolating device that occurs in operation in response to an increase of the first and second curvatures during application of a compression force.

6. The vibration isolating device according to claim 1, wherein the associated vibration isolation mass is arranged on the associated lever in a region that exhibits a maximum ratio between a lever opening distance and a length decrease of the vibration isolating device that occurs in operation in response to an increase of the first and second curvatures during application of a compression force.

7. The vibration isolating device according to claim 6, wherein the first elastically deformable plate comprises at least one first associated lever and the second elastically deformable plate comprises at least one second associated lever.

8. The vibration isolating device according to claim 7, wherein the first and second associated levers are interconnected by means of at least one spring element.

9. The vibration isolating device according to claim 8, wherein the spring element is one of a helical spring, an elastically deformable connecting plate, a diagonally arranged flat spring, a Belleville spring, a disk spring and a coned-disk spring with a connecting rod.

10. The vibration isolating device according to claim 8, wherein the at least one spring element is arranged in a region of the first and second associated levers that exhibits a maximum ratio between a lever opening distance and a length decrease of the vibration isolating device that occurs in operation in response to an increase of the first and second curvatures during application of a compression force.

11. The vibration isolating device according to claim 1, wherein the first and second elastically deformable plates are interconnected by means of at least one spring element.

12. The vibration isolating device according to claim 11, wherein the spring element is one of a helical spring, an elastically deformable connecting plate, a diagonally arranged flat spring, a Belleville spring, a disk spring and a coned-disk spring with a connecting rod.

13. The vibration isolating device according to claim 11, wherein the at least one spring element is arranged in a region of the at least one of the first and second elastically deformable plates that exhibits a maximum ratio between a bulging distance and a length decrease of the vibration isolating device that occurs in operation in response to an increase of the first and second curvatures during application of a compression force.

14. The vibration isolating device according to claim 1, wherein the first component is a main gearbox of a helicopter and the second component is a fuselage of the helicopter.

15. The vibration isolating device according to claim 1, wherein at least one elastically deformable plate comprises a weight adjusting arrangement having an adjustable vibration isolation mass and a drive unit that is mounted on the elastically deformable plate for achieving a weight adjustment by a translational movement a center of gravity of the adjustable vibration isolation mass; the translational movement being imposed on the adjustable vibration isolation mass by means of the corresponding drive unit in the form of a linear drive.

16. The vibration isolating device according to claim 1, wherein at least one elastically deformable plate comprises a weight adjusting arrangement having an adjustable vibration isolation mass and a drive unit that is mounted on the elastically deformable plate for achieving a weight adjustment by a rotational movement a center of gravity of the adjustable vibration isolation mass; the rotational movement being imposed on the adjustable vibration isolation mass by means of the corresponding drive unit in the form of a rotational drive.

17. A helicopter with a first component that is elastically coupled to a second component by the vibration isolating device according to claim 1.

* * * * *